United States Patent [19]

Barry et al.

[11] Patent Number: 5,292,569
[45] Date of Patent: Mar. 8, 1994

[54] ROTATIONALLY RELIEVED FLEXURE FOR ACCELEROMETER

[75] Inventors: John M. Barry, Lexington; Anthony Petrovich, Tewksbury; Thomas E. Shelvey, Westford, all of Mass.

[73] Assignee: The Charles Stark Draper Laboratory, Inc., Cambridge, Mass.

[21] Appl. No.: 936,092

[22] Filed: Aug. 26, 1992

[51] Int. Cl.⁵ .............................................. B32B 3/10
[52] U.S. Cl. ....................................... 428/66; 428/65; 73/514; 73/517 B
[58] Field of Search ...................... 428/65, 66; 73/514, 73/517 B

[56] References Cited

U.S. PATENT DOCUMENTS

| 2,643,869 | 6/1953 | Clark | 73/517 R |
| 3,283,586 | 11/1966 | Davies et al. | 73/516 R |

*Primary Examiner*—Alexander S. Thomas
*Attorney, Agent, or Firm*—Joseph S. Iandiorio

[57] ABSTRACT

A flexure for an accelerometer includes an inner hub; an outer rim spaced from the inner hub; one of the hub and rim being mounted to the accelerometer body and the other to the proof mass of the accelerometer; at least three curved tapered beams extending between the rim and the hub with the widest beam portion proximate the rim, for flexibly supporting the proof mass and enabling relative rotational relief between the hub and rim for preventing nonlinear stretching of the beams.

8 Claims, 7 Drawing Sheets

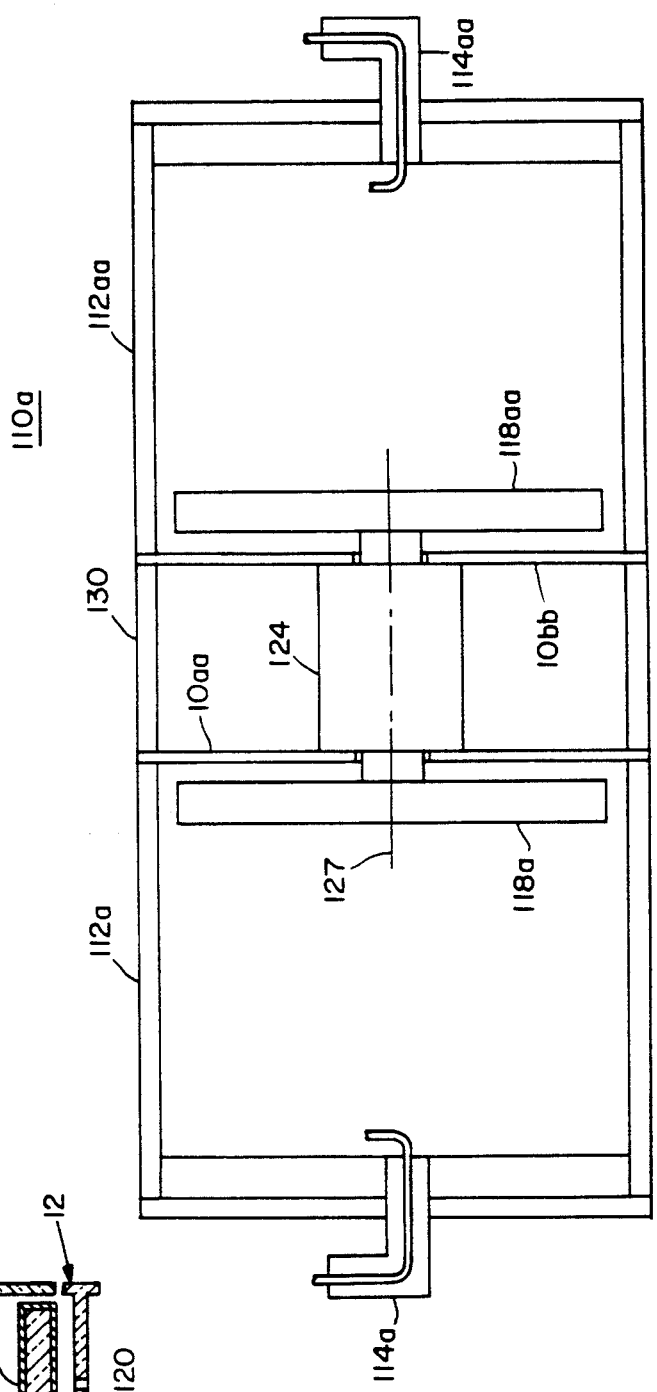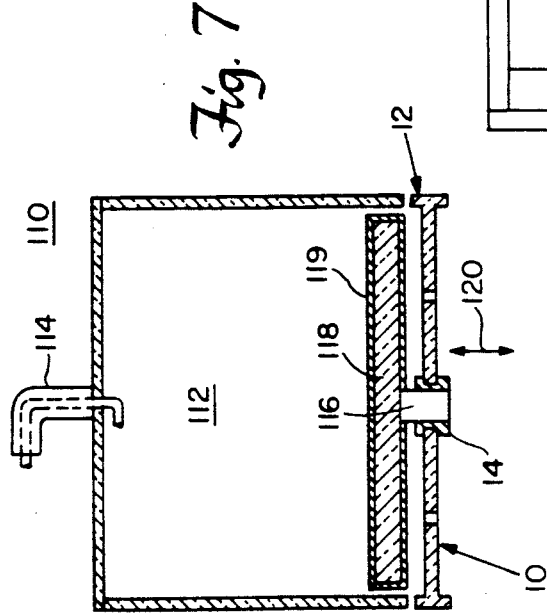

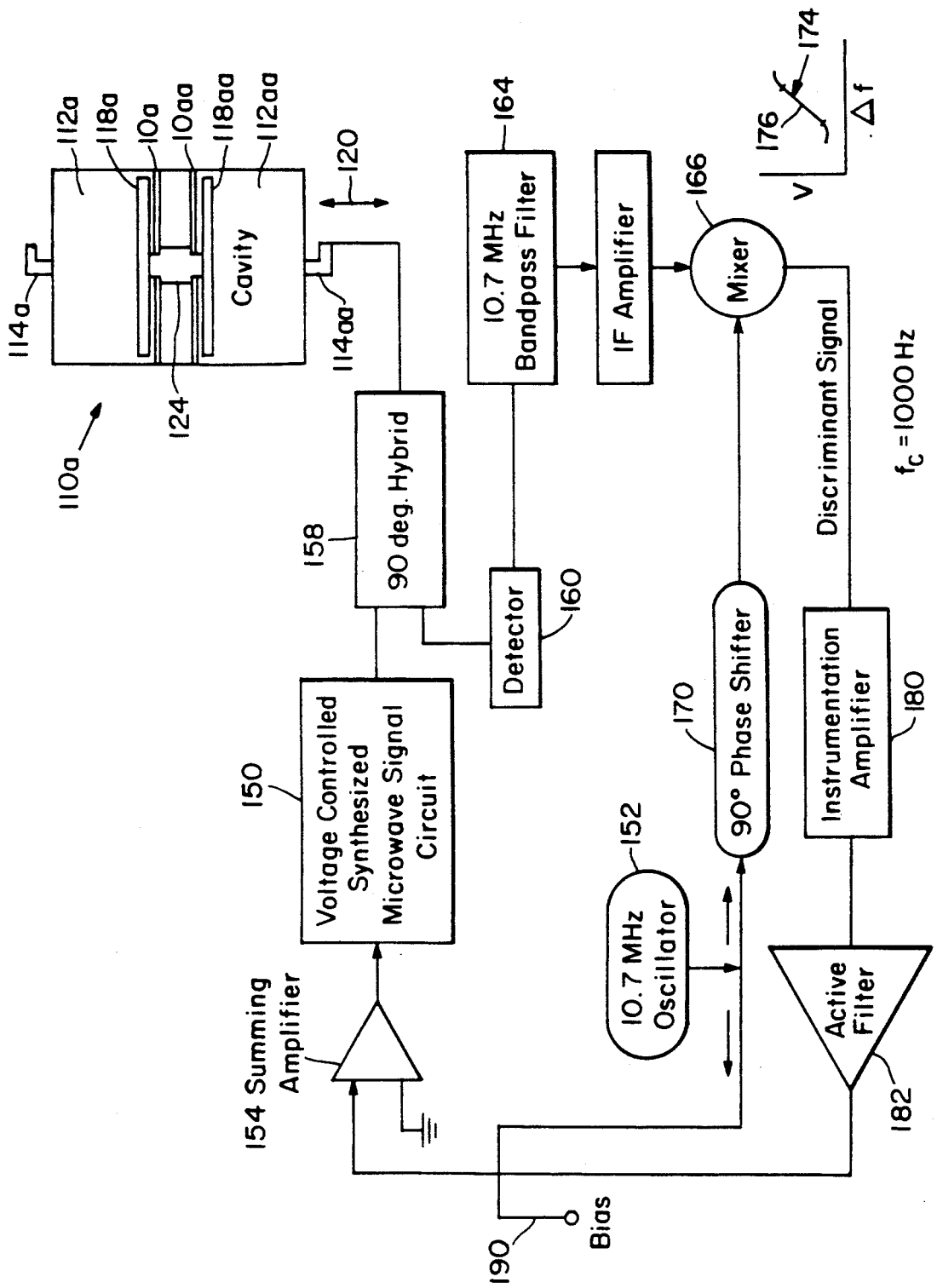

ROTATIONALLY RELIEVED FLEXURE FOR ACCELEROMETER

FIELD OF INVENTION

This invention relates to a rotationally relieved flexure for an accelerometer.

BACKGROUND OF INVENTION

Conventional flexures for supporting a proof mass in an accelerometer are generally formed of ceramic oxides such as silicate glasses (silica), crystallized glasses (lithium aluminum silicate) and crystalline solids (sapphire, quartz). These materials are preferred because of their low hysteresis and low anelastic response. However, there are certain problems associated with these flexures, primarily their susceptibility to stress fractures. This is particularly apparent in flexures which contain a pattern of cuts or holes in the flexure plate in order to increase the flexibility. In such cases the stress concentrations at the cuts and/or at the junctions of elements formed by the cuts and/or holes lead to early stress-related failure. A second problem is that the deflection of the flexure introduces non-linearity in the response and the greater the deflection the greater the non-linearity of the response. This consequently limits the range over which a particular accelerometer can operate and requires increased data processing to compensate for the non-linearity.

SUMMARY OF INVENTION

It is therefore an object of this invention to provide an improved flexure for an accelerometer which substantially reduces non-linear response.

It is a further object of this invention to provide such an improved flexure for an accelerometer which substantially reduces stress concentration.

It is a further object of this invention to provide such an improved flexure for an accelerometer which is simple and inexpensive.

It is a further object of this invention to provide such an improved flexure for an accelerometer which has a much greater range of operation.

It is a further object of this invention to provide such an improved flexure for an accelerometer which requires much less data processing to produce an accurate response.

This invention results from the realization that a truly simple yet effective flexure for an accelerometer can be achieved using at least three curved, tapered beams interconnecting a hub and a spaced outer rim to enable the hub and rim to rotate relative to one another during flexing to prevent non-linear stretching of the beams.

This invention features a flexure for an accelerometer including an inner hub and an outer rim spaced from the inner hub. One of the hub and rims is mountable to the accelerometer body and the other to the proof mass of the accelerometer. There are at least three curved, tapered beams extending between the rim and the hub with the widest beam portion being proximate the rim, for flexibly supporting the proof mass and enabling relative rotational relief between the hub and rim for preventing nonlinear stretching of the beams.

In a preferred embodiment the narrow end of each beam is enlarged where it engages the hub to provide more uniform stress distribution. The hub and the rim may be circular and may be concentric, and they may be thicker than the beams in the axial direction. There may be at least three beams and they may be evenly spaced about the rim. The rim hub and beams may be integrally formed, and at least the beams may be made of ceramic oxide material. Each beam may engage the hub substantially tangentially.

BRIEF DESCRIPTION OF THE DRAWINGS

Other objects, features and advantages will occur to those skilled in the art from the following description of a preferred embodiment and the accompanying drawings, in which:

FIG. 7 is a schematic plan view of a single-stage microwave resonator accelerometer using the flexure according to this invention;

FIG. 8 is a cross-sectional view of a two-stage differential microwave resonator accelerometer using the flexure according to this invention;

FIG. 10 is a more detailed schematic block diagram of a portion of the system of FIG. 9 associated with one of the stages;

DETAILED DESCRIPTION OF THE DRAWINGS

Figure 1:
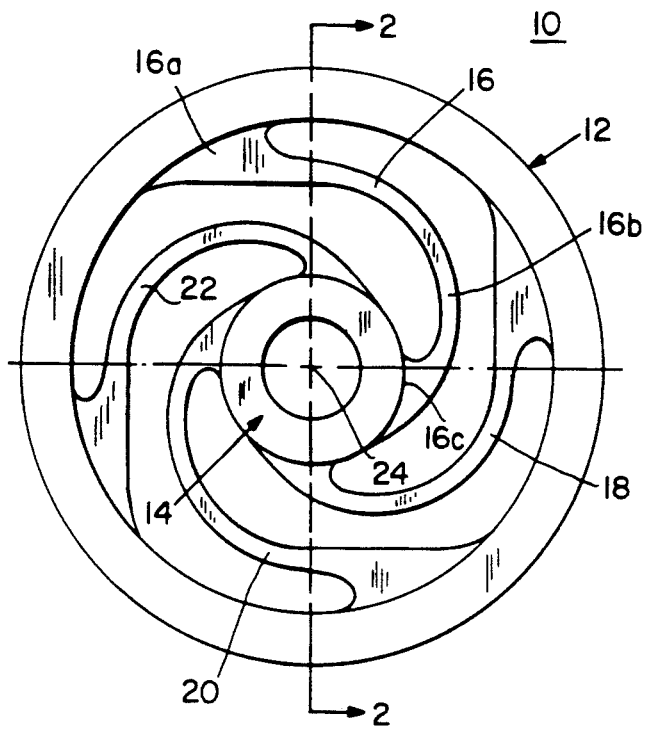
FIG. 1 is a top plan view of a flexure according to this invention.
Figure 2:
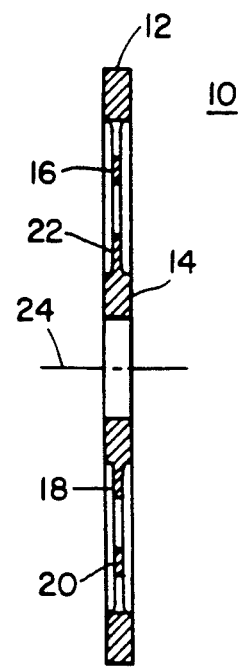
FIG. 2 is a side sectional view taken along line 2—2 of FIG. 1.

There is shown in FIG. 1 a flexure 10 for an accelerometer, including a rim 12 and hub 14 interconnected by a number, in this case four, of tapered beams 16, 18, 20 and 22. Although four beams are used in the illustration of FIG. 1, more or fewer beams can be used. However, at least three beams are required. The rim, the hub and the beams may be made integrally, as shown in FIG. 1, or they may be separate parts joined together. Each beam is curved, as indicated by beam 16, for example, and tapered, with its larger portion 16a attached to rim 12, and its smaller portion 16b attached to hub 14. The foot 16c or very tip of beam 16 is enlarged to more uniformly distribute the stress at the connection between beam 16 and hub 14. While hub 14 and rim 12 are shown circular, this is not a necessary limitation of the invention, as they may be square or any other geometric or irregular shape. At least the beam portion is made of ceramic oxides: silicate glasses such as silica; crystallized glasses such as lithium or aluminum silicate; or crystalline solids such as sapphire and quartz. Typically the entire flexure 10, including rim 12, hub 14 and beams 16, 18, 20 and 22, are made integrally of the same material. Hub 14 and rim 12 are made slightly thicker in the direction of axis 24, FIG. 2, than the beams 16, 18, 20 and 22.

Figure 3:
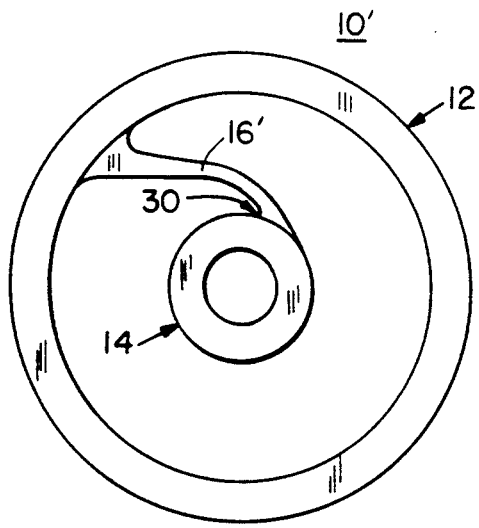
FIG. 3 is a schematic plan view showing more clearly the curved tapered tangential orientation of a beam with respect to the hub of the flexure of FIGS. 1 and 2.
Figure 4:
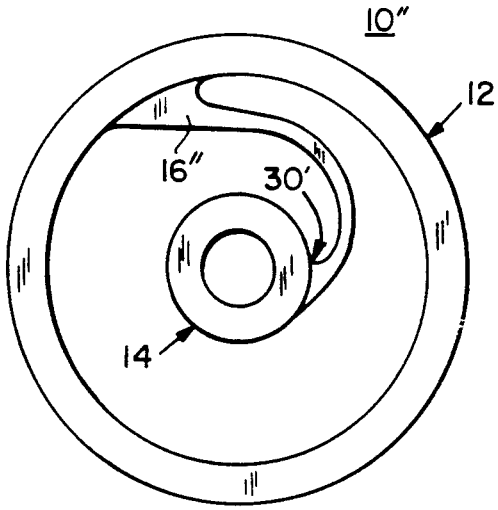
FIG. 4 is a view similar to FIG. 3 showing the sacrifice of perfectly tangential engagement in lieu of a longer curved path.

Preferably each of the beams meets with hub 14 basically at a tangential junction 30, FIG. 3, shown with respect to beam 16'. The tangential junction 30 between hub 14 and beam 16' minimizes the stress at that junction. Often the tangential connection takes a secondary consideration in order to obtain a sufficient length to provide the required flexibility as indicated by beam 16', FIG. 4, which meets hub 14 at a much steeper angle than does beam 16' in FIG. 3.

Figure 5:
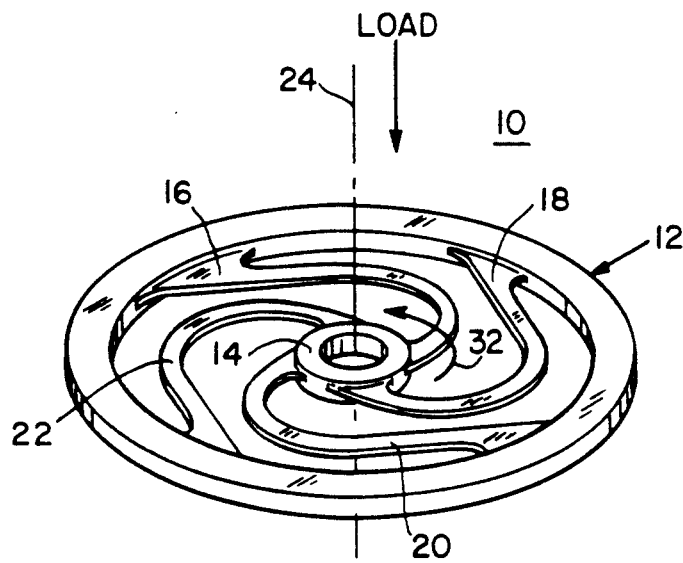
FIG. 5 is a three-dimensional view of the flexure of FIG. 1 showing the relative rotation between the hub and rim under an axial load.

In operation, either rim 12 or hub 14 is fixed to the body of an accelerometer while the other one constitutes or carries the proof mass. Then, in accordance with this invention, when an axial acceleration force is applied, hub 14 and rim 12 undergo relative rotation and relative displacement, thereby permitting the flexure to flex and at the same time relieving by the relative rotation the non-linear stretching of the beams. This is shown in FIG. 5, where a force along axis 24 on hub 14 which in this case is made to carry the proof mass, causes hub 14 to rotate in the counterclockwise direction as indicated by arrow 32 with respect to rim 12, which in this specific example is fixed to the body of the accelerometer. This relative rotation of hub 14 and rim 12 under the influence of a load along axis 24 enables beams 16, 18, 20 and 22 to flex without nonlinear stretching, thus providing a much greater range of motion or flexure which provides a larger signal to be sent to and processed by the accelerometer system.

Figure 6:
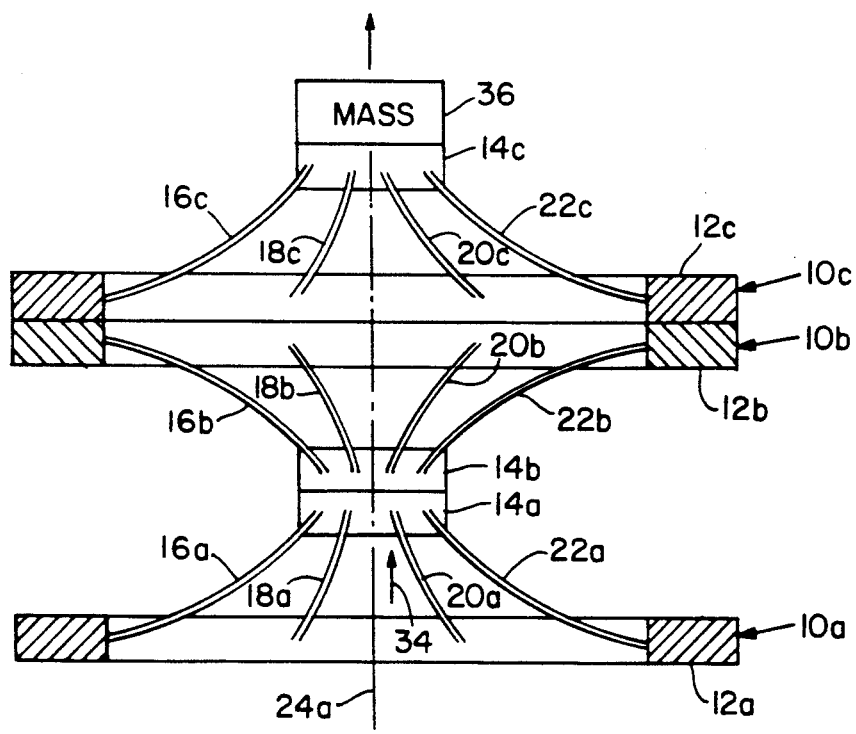
FIG. 6 is a schematic side elevational view of a series of three stacked flexures of the type shown in FIG. 1.

Flexures 10 may be stacked in series to provide additional flexibility and an even greater range of motion, which in turn provides a greater range of sensitivity for the accelerometer. Such a stacked construction is shown in FIG. 6, where a number of flexures 10a, 10b and 10c are connected in series. The rim 12a of flexure 10a is fixed to the accelerometer body. With a force applied along axis 24a, through beams 16a, 18a, 20a and 22a, hub 14a is driven along axis 24a in the direction of arrow 34 and is simultaneously rotated as explained previously. Hub 14a is connected to hub 14b of flexure 10b, which in turn is fixed to its rim 12b by its beams 16b, 18b, 20b and 22b; and rim 12b is fixed to rim 12c of flexure 10c, which in turn is connected through its beams 16c, 18c, 20c and 22c to its hub 14c which contains the proof mass 36.

There is shown in FIG. 7 a flexure 10 according to this invention in a single-stage microwave resonator accelerometer 110 including a cavity 112 with a coaxial coupler 114 for coupling into cavity 112 microwave energy, typically in the gigaHertz range. At the other end, cavity 112 includes ceramic flexure 10 which carries a proof mass 118 having mounting pin 116. Proof mass 118 has a metal surface 119 provided to act as a reflecting surface for the microwave energy since ceramic flexure 10 does not have reflective properties. For this reason, proof mass 118 is located inside of cavity 112. The ceramic flexure plate 10 may be made of any of a variety of ceramics such as sapphire, quartz, glasses such as silica or modified silica, other crystal and ceramic materials, glass ceramic, e.g. partially crystallized glasses. The cavity could be made of a low-expansion coefficient material such as Invar, titania modified silica, or partially recrystallized lithium-aluminate silicate glass, for example.

In operation, a microwave signal, for example in the range of 10 GHz, is coupled to cavity 112 through coupling 114. The resonant frequency of cavity 112 is also 10 GHz. An acceleration force in either direction, as indicated by arrow 120, causes the movement of proof mass 118 that moves ceramic flexure 10 and thereupon changes the geometry of chamber 112. This change in the geometry of chamber 112 changes the resonant frequency to somewhat above or below the 10 GHz point. The reflected resonant signal is coupled back out of cavity 112 through coupling 114. The difference between the submitted microwave signal and the reflected microwave signal is used to determine the acceleration force applied to proof mass 118 as is explained hereinafter.

In another implementation, microwave resonator accelerometer 110b, FIG. 8, is constructed as a dual-stage differential accelerometer. There are two cavities 112a, 112aa, each of which includes a coaxial coupler 14a, 14aa. There are two ceramic flexure plates 10aa, 10bb, each associated with its own proof mass plate 118a, 118aa which are fixed together by connector 124, which also forms a part of the effective proof mass.

Figure 9:
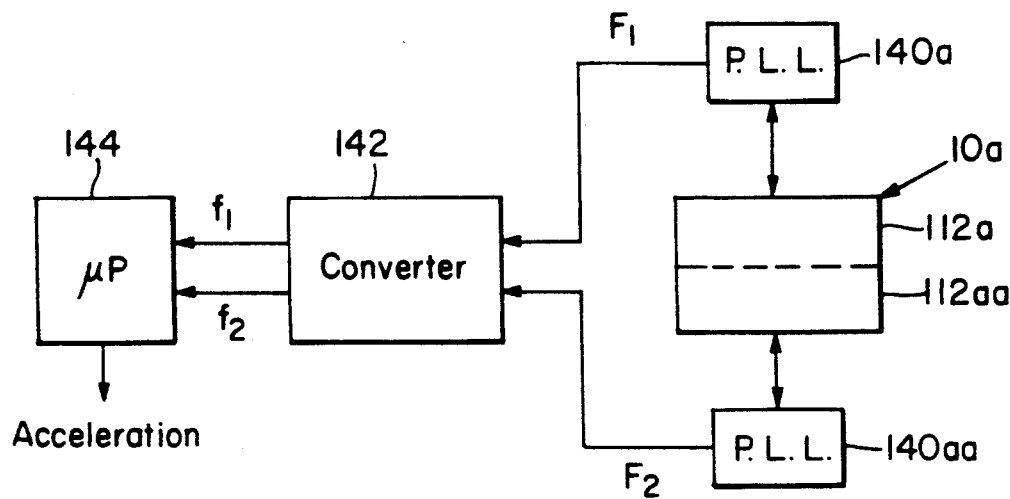
FIG. 9 is a block diagram of a complete two-stage differential microwave resonator accelerometer system employing the flexure according to this invention.

In a dual-cavity differential microwave resonator accelerometer 10a as shown in FIG. 8, each cavity 112a, 112aa has associated with it a phase locked loop circuit 140a, 140aa, FIG. 9. When an acceleration force is sensed by proof mass 118, the geometry of the two cavities is complementarily affected: one has its resonant frequency increased, the other decreased. As a result, phase locked loop circuits 140a and 140aa put out two different frequencies $F_1$ and $F_2$, in their reflective signals, one of which is higher and one of which is lower than the original resonant frequency of the cavities which were initially, nominally, tuned to the same resonant frequency. These microwave frequencies $F_1$, $F_2$ in the gigaHertz range are converted in converter 142 to lower frequencies, typically in the megaHertz range, $f_1$, $f_2$, more suitable for direct compatible processing in a digital microprocessor 144.

Figure 11:
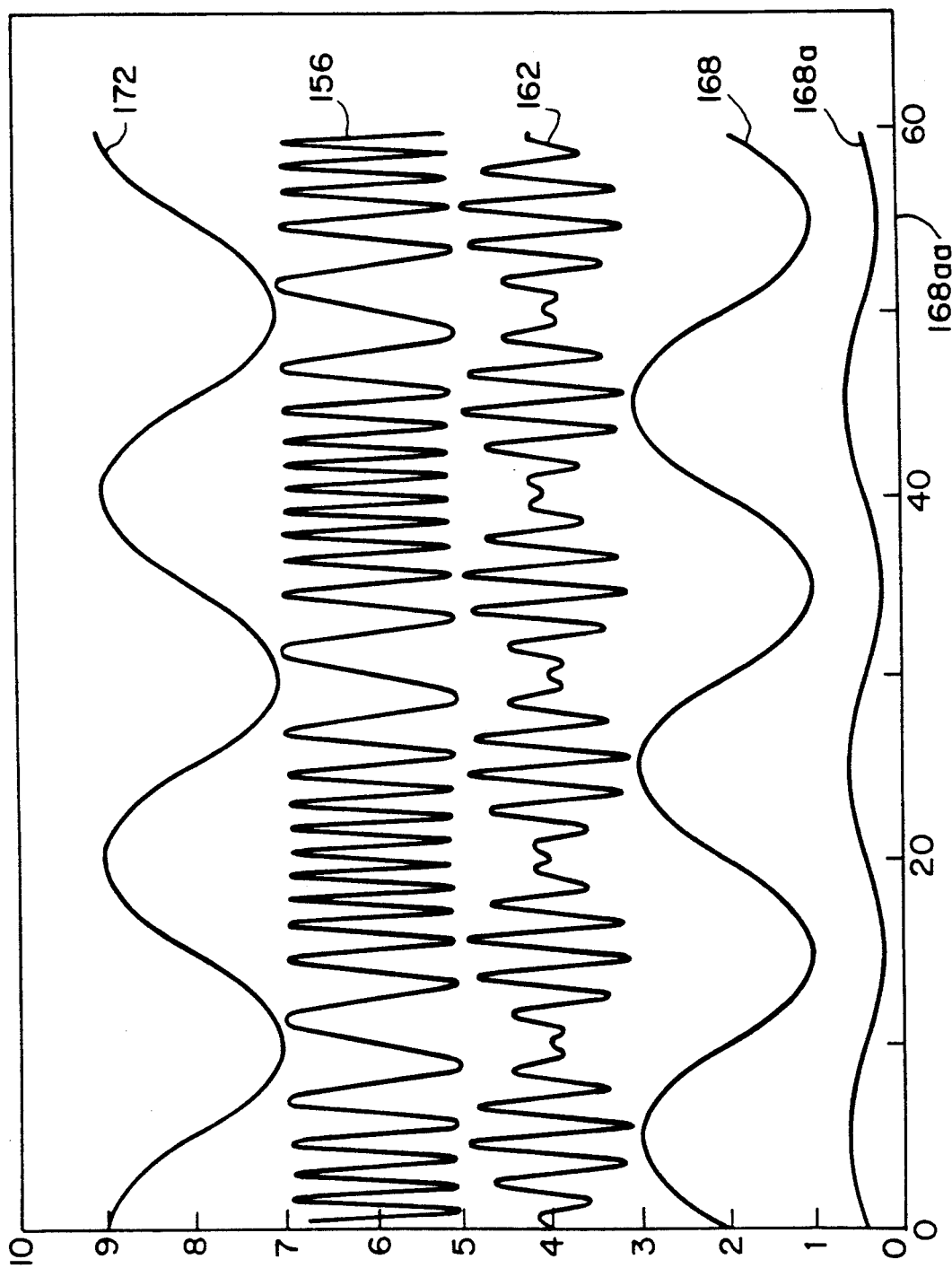
FIG. 11 illustrates a number of the waveforms that are present in the circuit of FIG. 10.

The difference $\Delta f$ in the two frequencies $f_1$, $f_2$ is calibrated in microprocessor 144 to produce a direct reading of acceleration. Phase locked loop circuits 140a, 140aa may be implemented as indicated with respect to circuit 140aa, shown in greater detail in FIG. 10. Voltage controlled synthesized microwave signal circuit 150 produces a 10 GHz signal modulated at 10.7 MHz by a signal from oscillator 152 delivered through summing amplifier 154. This signal, represented by the waveform 156 in FIG. 11, is delivered through 90° hybrid circuit 158 to coupler 114aa of cavity 112aa. The microwave energy is introduced and reflected in cavity 112aa, from whence it is returned to hybrid circuit 158 and directed to detector 160. The return wave or reflected wave delivered by hybrid circuit 158 to detector 160 is illustrated as wave form 162, FIG. 11. Bandpass filter 164 blocks frequencies other than 10.7 MHz which are submitted to mixer 166. Detector 160 detects the envelope of signal 162, which envelope appears as waveform 168 in FIG. 11. Also supplied to mixer 166 is the same 10.7 MHz signal from oscillator 152 which is used to modulate the 10 GHz carrier signal in circuit 150. However, in this case the 10 MHz signal from oscillator 152 is shifted 90° by phase shifter 170. The output of phase shifter 170 appears as waveform 172 in FIG. 11. The multiplication of the two signals in mixer 166 results in a discriminator signal 172 which appears as indicated at waveform 174, FIG. 10, that shows the variation in voltage V with change in frequency f. By operating on the linear portion 176 of this curve, the DC output of mixer 166 can be amplified in amplifier 180, filtered by filter 182 and fed back to summing amplifier 154 to adjust the voltage input, thus the frequency output, from circuit 150.

Thus, in operation, as an acceleration force 120 is applied to proof mass 118aa, the geometry of cavity 112aa is changed. This changes the resonant frequency, which makes the reflected wave to detector 160 differ from the input signal from circuit 150. This difference directly represents the accelaration force applied to the proof mass. However, by monitoring the change in frequency of circuit 150 demanded by summing amplifier 154 through the feedback from mixer 166, a frequency varying signal representative of the acceleration can be easily obtained. This frequency varying signal representative of the acceleration can be easily obtained. This frequency varying signal representative of the acceleration is directly compatible with subsequent digital signal processing after it has been stepped down from the microwave Ghz range to the more common MHz signal processing range as is accomplished by converter 142, FIG. 9. The bias input 190 to summing amplifier 154 is used to adjust the output frequency from circuit 150, typically in the range of 10 GHz in order to match the resonant frequency of cavity 112aa.

Waveform 168 corresponds to a moderate accelerating force. For a lower accelerating force the detector output will appear as at 168a, and for no accelerating force it appears as a straight flat line coincident with the abscissa indicated at 168aa. Thus as a result of the 90° phase shift introduced by phase shifter 170, the system exhibits a maximum sensitivity: that is, when there is no acceleration force there is a zero differential signal provided, but any, even slight, acceleration force begins to provide a signal as indicated at 168aa, which could reach the magnitude of waveform 168 or beyond.

Typically, it is not practical to have both cavities set to the same resonant frequency, and therefore the system is operated with an offset between those two resonant frequencies. This is accommodated by simply setting the zero G acceleration force at some finite level above zero, then frequency differentials below that level indicate an acceleration in the negative direction while those above it indicate acceleration in the positive direction, or vice versa: the nomenclature is arbitrary.

Figure 12:
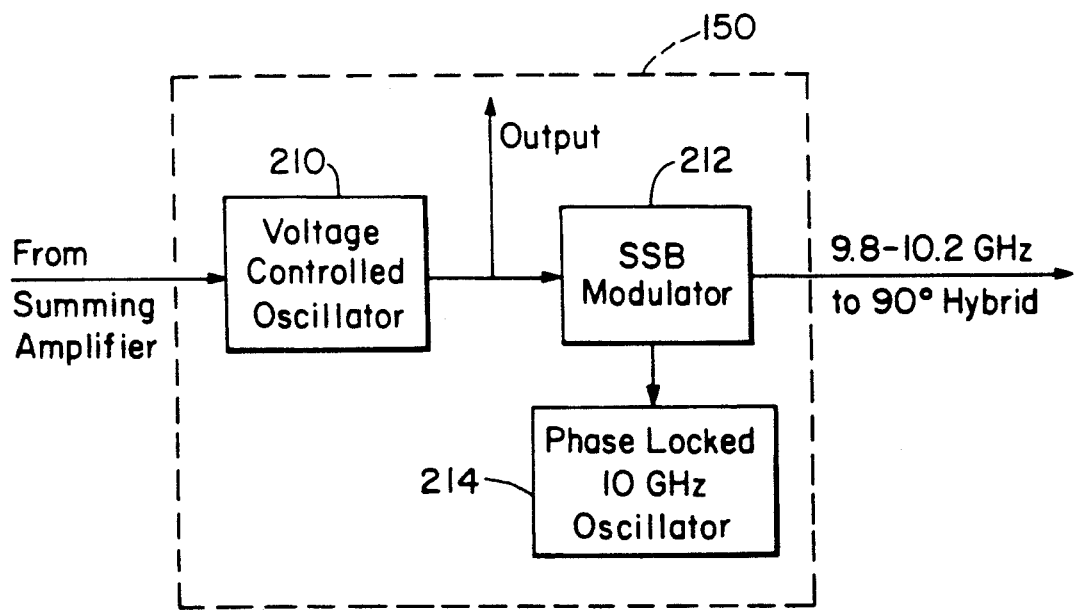
FIG. 12 is a more detailed block diagram of the voltage controlled synthesized microwave signal circuit of FIG. 10.

Voltage-controlled synthesized microwave signal circuit 150 may include a voltage-controlled oscillator 210, FIG. 12, which is used to effect a single side band modulation in modulator 212 of the 10 GHz signal delivered by phase locked oscillator 214.

Figure 13:
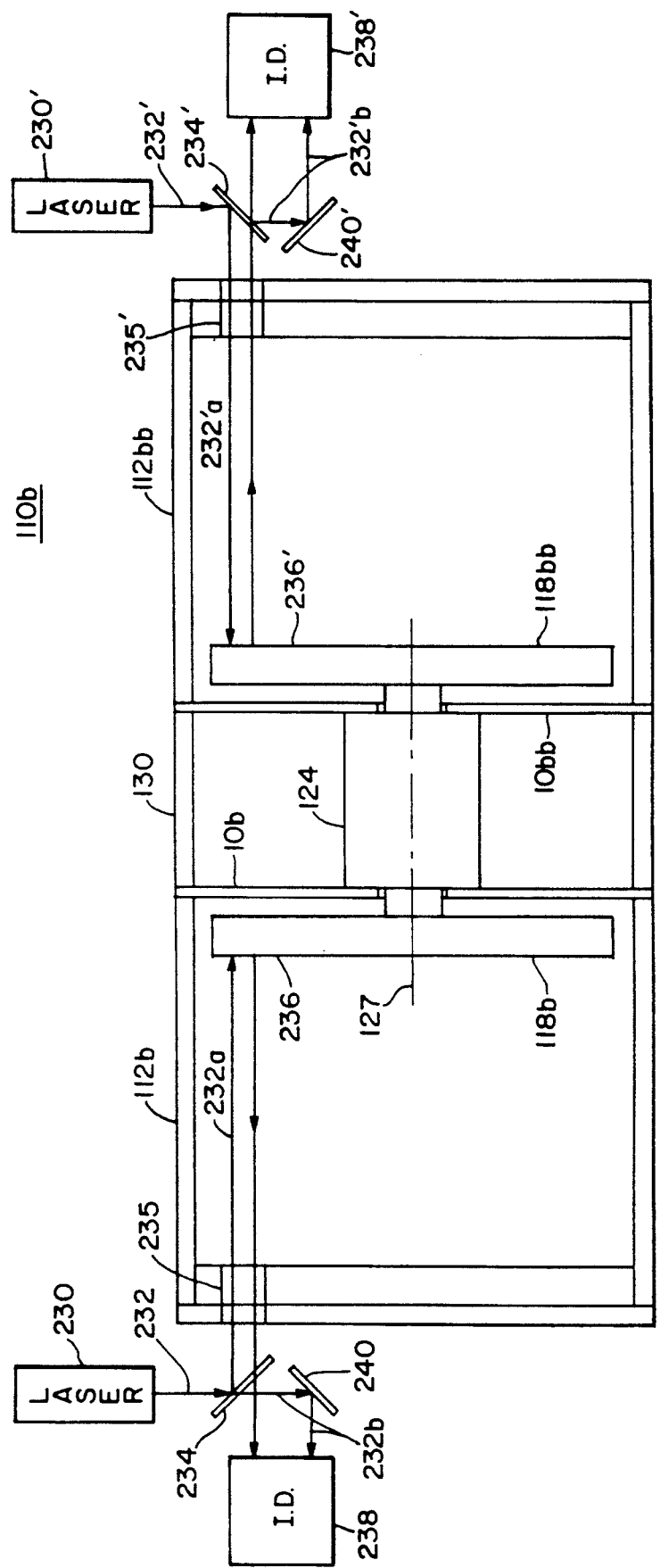
FIG. 13 is a view similar to FIG. 8 using optical as opposed to microwave detection.

Although thus far the invention is shown implemented with microwave detection, it may as well be any other form of sensing or detection system. For example, as shown in FIG. 13, the accelerometer system 10a of FIG. 8 could as well be implemented with optical detectors, where a laser source 230, FIG. 13, provides a laser beam 232 which strikes half-silvered mirror 234 so that one portion 232a of beam 232 moves through aperture 235, strikes reflective surface 236 on proof mass 118b in cavity 112b, and returns through aperture 235 to be received by interferometric detector 238. At the same time, the other portion 232b of beam 232 is reflected from mirror 240 to interferometric detector 238, where it acts as the reference beam to provide an interferometric readout indicative of the motion of proof mass 118b. A similar apparatus can be used with respect to cavity 112bb.

Although specific features of the invention are shown in some drawings and not others, this is for convenience only as some feature may be combined with any or all of the other features in accordance with the invention.

Other embodiments will occur to those skilled in the art and are within the following claims:

What is claimed is:

1. A flexure for an accelerometer comprising:
   an inner hub;
   an outer rim spaced from said inner hub; and
   at least three curved, tapered beams extending between said rim and said hub with the widest beam portion proximate said rim for flexibly supporting the proof mass of said accelerometer and enabling relative rotational relief between said hub and rim for preventing non-linear stretching of the beams; said beams being tapered along a portion of their lengths extending from said hub and said rim.

2. The flexure of claim 1 in which said narrow end of each beam is enlarged where it engages said hub to provide more uniform stress distribution.

3. The flexure of claim 1 in which said hub and rim are circular.

4. The flexure of claim 1 in which said hub and rim are concentric.

5. The flexure of claim 1 in which said hub and rim are thicker than said

6. The flexure of claim 1 in which said beams are evenly spaced about said rim.

7. The flexure of claim 1 in which said rim, hub and beams are integrally formed.

8. The flexure of claim 1 in which at least said beams are made of ceramic oxide material.

* * * * *